Patented Mar. 11, 1941

2,234,201

UNITED STATES PATENT OFFICE 2,234,201

TETRAKISAZO DYESTUFFS

Chiles E. Sparks, Wilmington, Del., assignor to E. I. du Pont de Nemours & Company, Wilmington, Del., a corporation of Delaware No Drawing. Application September 12, 1939, Serial No. 294,419

14 Claims. (Cl. 8—46)

This invention relates to direct tetrakisazo dyes of the type A←Y←X→Y→A wherein X is the radical of any diamino phenoxy compounds represented generally by the formula

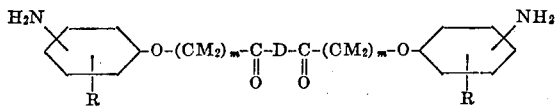

the Y's are radicals of a class of arylamines which are capable of acting as coupling components, and the A's are radicals of dihydroxy compounds of the benzene series. In the radical of X, M occurs twice in each radical and each represents members of a group consisting of hydrogen and alkyl, and $m$ is an integer 1 to 10. The symbol D represents radicals of a class of diamino and di-imino compounds hereinafter to be explained. These dyes are valuable direct dyes for cotton and similar cellulosic substances. They produce dyeings in bright shades. Superior washing fastness without loss of brightness or marked change of shade can be attained by after-treating the dyeings with formaldehyde, thus providing a class of dyes with which direct dyeings on cotton can be made by employing simple and economical methods and by means of which dyeings in bright shades having superior washing fastness and moderate light fastness are produced.

Direct colors for cotton and similar fibers which give even dyeings and have good brightness with good washing fastness are desired by the art. Direct tetrakisazo colors which are substantive to cotton but which are fugitive to washing, showing considerable loss in strength and imparting an undesirable stain in washing to undyed associated fibers are known. Tetrakisazo combinations which are made by azotizing a direct dyeing and developing on the fiber with suitable coupling compounds are also known. The latter colors are in general duller in shade than direct colors and they are more costly to produce than direct colors by reason of the various operations incidental to azotization of a direct dyeing and subsequent development on the fiber. A change in shade usually resulting during such a development is sometimes inconvenient for the dyer where shades are to be duplicated. It is therefore desirable to provide direct colors having bright shades and superior washing fastness which will produce dyeings economically and conveniently.

It is among the objects of this invention to provide direct tetrakisazo dyes which are substantive to cotton and other similar dye susceptible materials, such as regenerated cellulose fibers. Another object of the invention is to provide new shades in such direct tetrakisazo dyes which give dyeings having good brightness, superior washing fastness, moderate light fastness and other satisfactory characteristics. Another object of the invention is to provide tetrakisazo dyes which can be applied by simple economical methods and will give constant shade and superior washing fastness. Other objects of the invention will be apparent from the following description.

The objects of the invention are attained in general by providing direct tetrakisazo dyes of the type A←Y←X→Y→A which are made by diazotization of suitable primary aryl amines and coupling to suitable coupling compounds in the manner indicated by the above formula. In general one of a class of diamino diarylene compounds X is tetrazotized and coupled with a suitable compound Y, eventually resulting in forming a disazo compound H₂N—Y←X→Y—NH₂. This compound is tetrazotized and then coupled with the compound A forming A←Y←X→Y→A.

In the formula A represents a dihydroxy compound of the benzene series having a formula

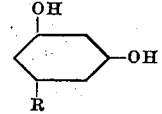

in which R is one of a group consisting of hydrogen, straight and branched chain alkyl having 1 to 6 carbons, alkoxy in which the alkyl portion is of like structure and number of carbons as alkyl, hydroxy, amino, CN, halogen, sulfonic acid and carboxyl.

Y is a compound capable of being coupled to a diazotized aryl amine and having a diazotizable amino group when coupled and is from the group consisting of types of amino phenyl pyrazolones, amino naphthalenes, amino benzenes and amino naphthols which are represented by formulas as follows.

(1) The aryl amino compounds of the benzene series have an open position for coupling indicated by —H para to amino and are represented by the formula

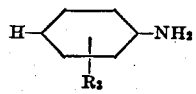

in which R₃ is one or more than one of any combination of the group consisting of hydrogen, alkyl and alkoxy.

(2) The 1-naphthylamines in which —H represents an open position for coupling are represented by the formula

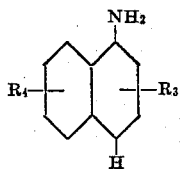

in which $R_4$ is one or more than one of any combination of the group consisting of hydrogen, alkyl, alkoxy, halogen, sulfonic acid and carboxyl.

(3) The 1- and 2-amino naphthols represented by the formulae

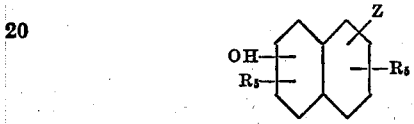

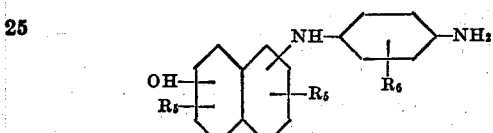

in which $R_5$ is one of a group consisting of hydrogen and sulfonic acid and —OH and —$SO_3H$ are separated by at least one unsubstituted position, Z is amino or amino benzoyl amino of the formula

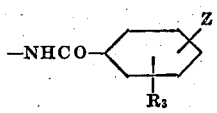

containing not more than two benzene nuclei and having one primary amino group meta or para to a —CO group, and $R_6$ is one of a group consisting of sulfonic acid and carboxyl. As illustrations of Z radicals, those represented by the formulae

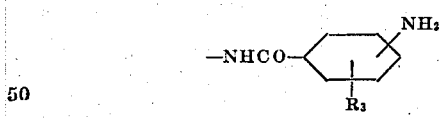

and

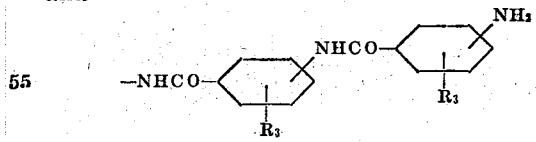

are mentioned.

(4) The 1(aminophenyl) pyrazolones which have amino in the meta or para position of the benzene nucleus and are represented by the formula

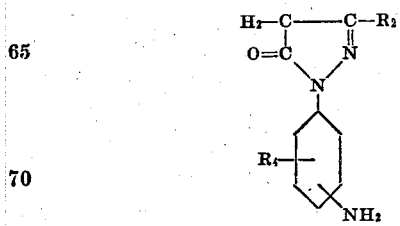

in which $R_2$ is methyl or COOH and $R_4$ is at least one of a group consisting of hydrogen, alkyl, alkoxy, halogen, sulfonic acid and carboxyl.

The compounds represented by X are any diamino phenoxy compounds represented by the formula

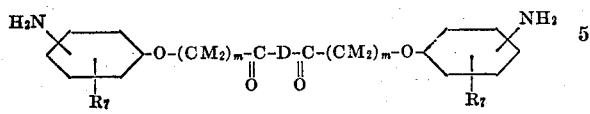

in which —$(CM_2)_m$ represents the group consisting of straight and branched chain aliphatic radicals wherein M occurs twice as indicated and the symbol M represents like and unlike members of the group consisting of hydrogen and alkyl radicals containing 1 to 6 carbons. Of these radicals there may be 1 to 10 as indicated by the subscript $m$. For example, —$(CM_2)_m$ includes such radicals as —$CH_2$—, —$CH_2$—$CH_2$—$CH_2$—,

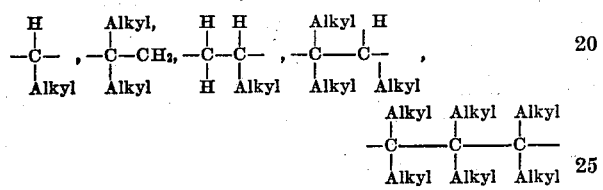

and

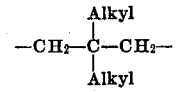

In these radicals alkyl may be any saturated aliphatic hydrocarbon radical containing 1 to 6 carbons such as

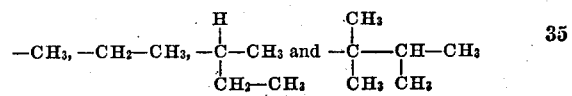

$R_7$ occupies one or more positions in the benzene nuclei and is from the group consisting of hydrogen, straight and branched chain alkyl having 1 to 6 carbons, the corresponding alkoxy groups, aryl, aryl-alkyl, halogen, CN, sulfonic acid and carboxyl. Where there is more than one $R_7$ these groups may be alike or different members of the designated group.

The symbol D represents a radical of the following diamino and di-imino compounds namely, straight and branched chain saturated aliphatic diamines and their derivatives represented by the formula $$NH_2—(CB_2)_n—NH_2$$

in which B occurs twice and represents like and unlike members of a group consisting of hydrogen and straight and branched chain aliphatic groups having 1 to 6 carbons, and in which there may be 2 to 10 of these radicals as indicated by the symbol $n$; diamino cycloalkanes having 4 to 6 carbons in the ring and the straight and branched chain saturated aliphatic derivatives thereof in which the substituent groups have 1 to 6 carbons; and cyclic di-imines having 3 to 6 carbons in the ring and the straight and branched chain saturated aliphatic derivatives thereof in which the substituent groups have 1 to 6 carbons.

The invention will be more fully set forth in the following more detailed description which includes examples that are given as illustrative embodiments of the invention and not as limitations thereof. Parts are given in parts by weight.

*Example 1*

A slurry was made of 143 parts of 1,2-di(4'-amino-phenoxy-acetyl-amino)ethane in 2,000 parts of water and 73 parts of 100% hydrochloric-acid were added as a 30% solution. The mixture was iced to 0° C. and 55 parts of 100% sodium-nitrite were added. Tetrazotization was carried out at 0–5° C. for one-half hour.

A slurry was made of 295 parts of 2(3'-aminobenzoyl-amino) - 5 - naphthol-7-sulfonic-acid in 2,000 parts of water and an aqueous solution of ammonia was added in sufficient quantity to make a complete solution and a slightly alkaline reaction to Brilliant Yellow Paper. Then 7 parts of sodium-bicarbonate were added, the solution was cooled to 0° C. and 170 parts of sodium-carbonate were added.

The tetrazo was slowly added to the cold alkaline solution of 2(3'-amino-benzoyl-amino)-5-naphthol-7-sulfonic-acid whilst maintaining an excess of the coupling component and alkalinity with sodium carbonate. The mixture was stirred one hour after the addition of the tetrazo, then the suspension was heated to 70°–80° C., salted 5% with sodium chloride and filtered.

The filter cake was slurried with 3,000 parts of water to a smooth slurry and 91 parts of 100% hydrochloric acid were added as a 30% solution. Tetrazotization was carried out at 10°–12° C. for one hour.

The tetrazo was slowly added to the cold alkaline solution of 1,3-dihydroxy-benzene, stirred one hour after the addition, heated to 60–70° C., salted 5% with sodium chloride, filtered and dried at 80°–85° C. in an oven. The dry powder had an orange appearance.

The compound is represented by the formula

The rinsed dyeing from the above operation was entered into 500 cc. of water at 130°–140° F. and approximately 10 cc. of 10% formaldehyde (25 cc. of approximately 37% formaldehyde by weight diluted to 250 cc. with water) were added. The dyeing was held in this solution and at this temperature for twenty minutes. The dyeing was then removed, rinsed and dried.

An alternative after-treating process which is the preferred procedure because of its economy and ease of application is carried out by adding to the dyebath at the end of the dyeing period 10 cc. of 10% formaldehyde at bath temperature. Then after twenty minutes, the dyeing is removed, rinsed and dried.

A dyeing with a bright yellow scarlet shade was obtained which showed excellent fastness to washing and good discharge properties.

*Example 2*

A tetrazo from 143 parts of 1,2-di(4'-aminophenoxy-acetyl-amino) ethane was prepared as described in Example 1.

A solution was prepared from 4,000 parts of water, 185 parts of 1(3'-amino-phenyl)-5-pyrazolone-3-carboxylic-acid, and 80 parts of sodium-carbonate was prepared and then 210 parts of sodium carbonate were added. The solution was cooled to 0°–5° C. and the tetrazo was slowly added to the cold alkaline solution of 1(3'-amino-phenyl)-5-pyrazolone-3-carboxylic-acid. An excess of the coupling component and sodium carbonate alkalinity was maintained and the mixture was stirred one hour after the addition of the tetrazo was added. The resulting suspension

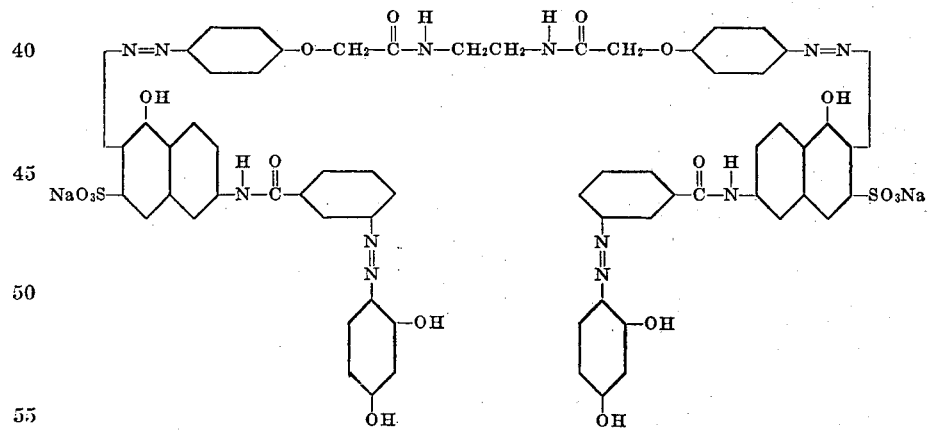

As illustrative of the manner of using the compounds of the invention, a dyebath was made by dissolving 0.4 g. of the above described product in 100 cc. of water at 190°–200° F. and adding 0.2 g. of sodium carbonate to assist the solution. The solution was diluted with stirring to a total volume of 500 cc. with water at approximately 160° F. and 40 cc. of a 10% solution of Glauber's salt were added. A 10 g. piece of regenerated cellulose fiber was wet out with water, squeezed partially dry and entered into the dyebath. The temperature of the dyebath was raised to 180°–190° F. in the course of fifteen minutes and held at that temperature for one hour with stirring at frequent intervals this time. At the end of one hour the dyeing was removed and rinsed in cold water.

was heated to 70°–80° C., and finally salted 5% with sodium chloride and filtered.

The filter cake was slurried with 3,000 parts of water to a smooth slurry and 91 parts of 100% hydrochloric acid were added as a 30% solution. The mixture was cooled with ice to 10° C. and 55 parts of 100% sodium nitrite were added as a 30% solution. Tetrazotization was carried out at 10°–12° C. for one hour.

A mixture was made by stirring 105 parts of 1,3-dihydroxy-benzene into 2,000 parts of water. The mixture was cooled to 0° C. and 212 parts of sodium carbonate were added.

The tetrazo was slowly added to the cold alkaline solution of 1,3-dihydroxy-benzene, stirred one hour after the addition and then heated to 60°–70° C. The suspension was salted 5% with sodium chloride, filtered and dried at 80°–85° C. in an oven. The dry powder had a yellow orange appearance and is represented by the formula The products of the following illustrations were prepared by methods similar to the foregoing.

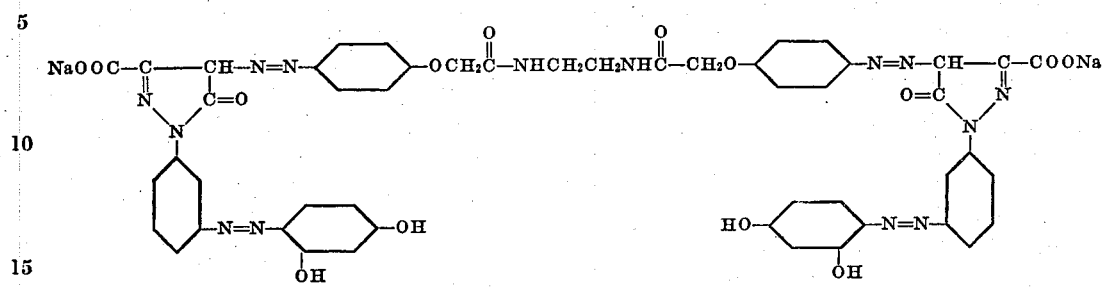

By dyeing and after-treating in a manner similar to that described in Example 1, a dyeing with a bright yellow orange shade was obtained which showed excellent fastness to washing.

The most applicable method of preparation will be easily ascertainable from the foregoing illustrations by those skilled in the art.

| Example | Combination | Shade |
|---|---|---|
| 3 | 1,2-di(4'-amino-2'-sulfophenoxyacetyl-amino) ethane ⇒ (2-amino-5-naphthol-7-sulfonic acid)₂ ⇒ (1,3-dihydroxy benzene)₂. | Red. |
| 4 | 1,2-di(4'-amino-phenoxy-acetyl-amino)ethane ⇒ (2-amino-5-naphthol-7-sulfonic acid)₂ ⇒ (1,3-dihydroxy-benzene)₂. | Bordeaux. |
| 5 | 1,2-di(4'-amino-phenoxy-acetyl-amino)ethane ⇒ 2(4'-amino-3'-sulfo-phenyl-amino)-5-naphthol-7-sulfonic-acid₂ ⇒ (1,3-dihydroxy-benzene)₂. | Maroon. |
| 6 | 1,2-di(4'-amino-2'-sulfophenoxyacetyl-amino)ethane ⇒ 2(3'-aminobenzoyl-amino)-5-naphthol-7-sulfonic acid₂ ⇒ (1,3-dihydroxy-benzene)₂. | Orange. |
| 7 | 1,2-di(4'-amino-2'-sulfophenoxyacetyl-amino)ethane ⇒ 2(4'-aminobenzoyl-amino)-5-naphthol-7-sulfonic acid₂ ⇒ (1,3-dihydroxy-benzene)₂. | Do. |
| 8 | 1,2-di(4'-amino-2'-sulfophenoxyacetyl-amino)ethane ⇒ 1(3'-aminophenyl)-5-pyrazolone-3-carboxylic acid₂ ⇒ (1,3-dihydroxy-benzene)₂. | Yellow. |
| 9 | 1,2-di(4'-amino-2'-sulfophenoxyacetyl-amino)ethane ⇒ 2(4'-amino-3'-sulfophenylamino)-5-naphthol-7-sulfonic acid₂ ⇒ (1,3-dihydroxy-benzene)₂. | Maroon. |
| 10 | 1,2-di(4'-amino-2'-sulfophenoxyacetyl-amino)ethane ⇒ (1-aminonaphthalene-6-sulfonic acid)₂ ⇒ (1,3-dihydroxy-benzene)₂. | Brown. |
| 11 | 1,2-di(4'-amino-2'-methoxyphenoxy-acetyl-amino)ethane ⇒ 2(3'-amino benzoyl amino)-5-naphthol-7-sulfonic acid₂ ⇒ (1,3-dihydroxy benzene)₂. | Scarlet. |
| 12 | 1,2-di(4'-amino-2'-methoxyphenoxy-acetyl-amino)ethane ⇒ (2-amino-5-naphthol-7-sulfonic acid)₂ ⇒ (1,3-dihydroxy benzene)₂. | Maroon. |
| 13 | 1,2-di(3'-amino-2'-methylphenoxyacetyl-amino) ethane ⇒ 1-(3'-aminophenyl)-5-pyrazolone-3-carboxylic acid₂ ⇒ (1,3-dihydroxy-benzene)₂. | Yellow. |
| 14 | 1,2-di(3'-amino-2'-methylphenoxyacetylamino) ethane ⇒ 2-(3'aminobenzoylamino)-5-naphthol 7-sulfonic acid₂ ⇒ (1,3-dihydroxy-benzene)₂. | Orange. |
| 15 | 1,2-di(3'-amino-2'-methylphenoxyacetyl-amino) ethane ⇒ (2-amino-5-naphthol-7-sulfonic acid)₂ ⇒ (1,3-dihydroxy-benzene)₂. | Maroon. |
| 16 | 1,2-di(3'-amino-2'-methylphenoxyacetylamino) ethane ⇒ (1-amino-5-naphthol-7-sulfonic acid)₂ ⇒ (1,3-dihydroxy-benzene)₂. | Do. |
| 17 | 1,2-di(3'-amino-2'-methylphenoxy-acetylamino) ethane ⇒ 2-(4'-amino-3'-sulfophenyl-amino)-5-naphthol-7-sulfonic acid₂ ⇒ (1,3-di-hydroxy-benzene)₂. | Rubine |
| 18 | 1,2-di(3'-aminophenoxyacetylamino) ethane ⇒ 2-(3'-aminobenzoylamino)-5-naphthol-7-sulfonic acid₂ ⇒ (1,3-dihydroxy benzene)₂. | Orange. |
| 19 | 1,2-di(3'-aminophenoxyacetylamino) ethane ⇒ (2-amino-5-naphthol-7-sulfonic acid)₂ ⇒ (1,3-dihydroxy-benzene)₂. | Maroon. |
| 20 | 1,2-di(4'-amino-2'-chlorophenoxy-acetylamino) ethane ⇒ 2-(3'aminobenzoylamino)-5-naphthol-7-sulfonic acid₂ ⇒ (1,3-dihydroxy-benzene)₂. | Scarlet. |
| 21 | 1,2-di(4'-amino-2'-chlorophenoxyacetylamino) ethane ⇒ (2-amino-5-naphthol-7-sulfonic acid)₂ ⇒ (1,3-dihydroxy-benzene)₂. | Maroon. |
| 22 | 1,2-di(4'-amino-2'-sulfophenoxyacetyl-amino) ethane ⇒ (1-aminonaphthalene)₂ ⇒ (1,3-dihydroxy-benzene)₂. | Brown. |
| 23 | 1,2-di(4'-amino-2'-sulfophenoxyacetylamino) ethane ⇒ (2-methoxy-5-methylaniline)₂ ⇒ (1,3-dihydroxy-benzene)₂. | Do. |
| 24 | 1,2-di(4'-aminophenoxyacetylamino) ethane ⇒ 2(4''(4'-aminobenzoyl) aminobenzoylamino)-5-naphthol-7-sulfonic acid₂ ⇒ (1,3-dihydroxy-benzene)₂. | Scarlet. |
| 25 | 1,2-di(4'-aminophenoxyacetylamino)ethane ⇒ (1-aminonaphthalene-6-sulfonic acid)₂ ⇒ (1,3-dihydroxy-benzene)₂. | Brown. |
| 26 | 1,2-di(4'-aminophenoxyacetylamino)ethane ⇒ (1-amino-2-methoxy-naphthalene-6-sulfonic acid)₂ ⇒ (1,3-dihydroxy-benzene)₂. | Do. |
| 27 | 1,2-di(4'-aminophenoxyacetylamino)ethane ⇒ (1-amino-8-naphthol-3,6-disulfonic acid)₂ ⇒ (1,3-dihydroxy-benzene)₂. | Do. |
| 28 | 1,6-di(4'-aminophenoxyacetylamino)hexane ⇒ [1-(3'-aminophenyl)-5-pyrazolone-3-carboxylic acid]₂ ⇒ (1,3-dihydroxy-benzene)₂. | Orange. |
| 29 | 1,6-di(4'-aminophenoxyacetylamino)hexane ⇒ [2-(3'-aminobenzoylamino)-5-naphthol-7-sulfonic acid]₂ ⇒ (1,3-dihydroxy-benzene)₂. | Scarlet. |
| 30 | 1,6 - di(4' - aminophenoxyacetylamino)hexane ⇒ (2 - amino - 5 - naphthol - 7 - sulfonic acid)₂ ⇒ (1,3-dihydroxy-benzene)₂. | Maroon. |
| 31 | 1,6 - di(4' - aminophenoxyacetylamino)hexane ⇒ (1 - amino - 5 - naphthol - 7 - sulfonic acid)₂ ⇒ (1,3-dihydroxy-benzene)₂. | Do. |
| 32 | 1,6-di(4'-aminophenoxyacetylamino)hexane ⇒ [2-(4'-amino-3'-sulfo-phenylamino)-5-naphthol-7-sulfonic acid]₂ ⇒ (1,3-dihydroxy-benzene)₂. | Rubine. |
| 33 | 1,2-di(4'-aminophenoxyacetylamino)ethane ⇒ [2-(3'-aminobenzoylamino)-5-naphthol-7-sulfonic acid]₂ ⇒ (1,3-dihydroxy-5-methyl benzene)₂. | Scarlet. |
| 34 | 1,2-di(4'-aminophenoxyacetylamino)ethane ⇒ [2-(3'-aminobenzoylamino-5-naphthol-7-sulfonic acid]₂ ⇒ (1,3-dihydroxy-benzene-5-sulfonic acid)₂. | Do. |
| 35 | 1,2-di(4'-aminophenoxyacetylamino)ethane ⇒ [2-(3'-aminobenzoylamino-5-naphthol-7-sulfonic acid]₂ ⇒ (1,3,5-trihydroxy-benzene)₂. | Do. |
| 36 | Di-(4'-amino-phenoxy-acetyl)-piperazine ⇒ (2-(4'-amino-3'-sulfo-phenyl-amino)-5-naphthol-7-sulfonic acid)₂ ⇒ (1,3-dihydroxy-benzene)₂. | Red violet. |
| 37 | Di-(4-amino-phenoxy-acetyl)-piperazine ⇒ (1-amino-5-naphthol-7-sulfonic acid)₂ ⇒ (1,3-dihydroxy-benzene)₂. | Maroon. |
| 38 | Di-(4-amino-phenoxy-acetyl)-piperazine ⇒ (2-amino-5-naphthol-7-sulfonic acid)₂ ⇒ (1,3-dihydroxy-benzene)₂. | Red violet. |
| 39 | Di-(4-amino-phenoxy-acetyl)-piperazine ⇒ (1-(3'-amino-phenyl)-5-pyrazolone-3-carboxylic acid)₂ ⇒ (1,3-dihydroxy-benzene)₂. | Orange. |

| Example | Combination | Shade |
|---|---|---|
| 40 | Di-(4-amino-phenoxy-acetyl)-piperazine ⟹ (2-amino-5-naphthol-1-sulfonic acid)₂ ⟹ (1,3-dihydroxy-benzene)₂. | Bordeaux. |
| 41 | Di-(4-amino-phenoxy-acetyl)-piperazine ⟹ (2-(4'-amino-benzoyl-amino)-5-naphthol-7-sulfonic acid)₂ ⟹ (1,3-dihydroxy-benzene)₂. | Scarlet. |
| 42 | 1,4-di-(4'-amino-phenoxy-acetylamino)-cyclohexane ⟹ (1-(3'-amino-phenyl)-5-pyrazolone-3-carboxylic acid)₂ ⟹ (1,3-dihydroxy-benzene)₂. | Yellow. |
| 43 | 1,4-di(4'-amino-phenoxy-acetylamino)-cyclohexane ⟹ (2-(3'-amino-benzoylamino)-5-naphthol-7-sulfonic acid)₂ ⟹ (1,3-dihydroxy-benzene)₂. | Scarlet. |
| 44 | 1,2-di(2'-amino-phenoxy-acetylamino)ethane ⟹ [2-(3'-aminobenzoylamino)-5-naphthol-7-sulfonic acid]₂ ⟹ (1,3-dihydroxy-benzene)₂. | Do. |
| 45 | 1,2-di(2'-amino-phenoxy-acetylamino)ethane ⟹ [1-(3'-aminophenyl)-5-pyrazolone-3-carboxylic acid]₂ ⟹ (1,3-dihydroxy-benzene)₂. | Orange. |

As representative of the many compounds which may be used as A components are mentioned 1,3-dihydroxy benzene, 1,3-dihydroxy-5-methyl benzene, 1,3-dihydroxy-5-isopropyl benzene, 1,3-dihydroxy-5-hexyl benzene, 1,3-dihydroxy-5-benzene sulfonic acid, 1,3-dihydroxy benzene-5-carboxylic acid, 1,3,5-trihydroxy benzene, 1,3-dihydroxy-5-methoxy benzene, 1,3-dihydroxy - 5-ethoxy benzene, 1,3 - dihydroxy-5-hexoxy benzene, 1,3-dihydroxy-5-amino benzene and 1,3-dihydroxy-5-benzo-nitrile.

Representative of Y components are: aniline, 3-amino toluene, 2,5-dimethoxy aniline, 2-methoxy aniline, 2-methoxy-5-methyl aniline; 1-amino naphthalene, 1-amino-2-methoxy-naphthalene, 1-amino-naphthalene-6-sulfonic acid, 1-amino-2-methoxy naphthalene-6-sulfonic acid, 1-amino-naphthalene-6-carboxylic acid, 1-amino-7-methoxy naphthalene, 1-amino-7-chloronaphthalene; 1,8-amino naphthol-3,6-disulfonic acid, 2-amino-8-naphthol-3,6-disulfonic acid, 1-amino-8-naphthol-4,6-disulfonic acid, 1-amino-8-naphthol-3,5-disulfonic acid, 1-amino-8-naphthol-4-sulfonic acid, 1-amino-5-naphthol-7-sulfonic acid, 2-amino-5-naphthol-7-sulfonic acid, 2-amino-8-naphthol-6-sulfonic acid, 1-amino-5-naphthol; 2-(4'-amino benzoyl amino)-5-naphthol - 7 - sulfonic acid, 2-(3'-amino benzoyl amino)-5-naphthol-7-sulfonic acid, 1-(4'- amino benzoyl amino)- 5 - naphthol-7-sulfonic acid, 2[4'-(4''-amino benzoyl amino) benzoyl amino] - 5 - naphthol - 7 - sulfonic acid, 1-(4'-amino benzoyl amino)-8-naphthol-4-sulfonic acid; 1-(3'-amino phenyl)-5-pyrazolone-3-carboxylic acid, 1-(4'-amino phenyl)-5-pyrazolone-3-carboxylic acid, 1-(3'-amino phenyl)-3-methyl-5-pyrazolone, 1-(4'-amino phenyl)-3-methyl-5-pyrazolone, 1-(2'-methoxy-5-amino phenyl)-3-methyl-5-pyrazolone, 1-(4'-amino-3'-carboxy)-3-methyl-5-pyrazolone, 1-(4'-amino-3'-carboxy)-3-methyl-5-pyrazolone, 1-(4'-amino-3'-sulfo)-5-pyrazolone-3-carboxylic acid, 1(2'-methyl-5'-amino phenyl)-3-methyl-5-pyrazolone, 1(2'-methyl-5'-amino phenyl)-5-pyrazolone-3-carboxylic acid and 1-(2'-chloro-5'-amino phenyl)-5-pyrazolone-3-carboxylic acid.

Representative of the many X components are: 1,2-di(4'-aminophenoxyacetylamino)ethane, 1,6-di(4'-aminophenoxyacetylamino)hexane, 1,10-di(4'-aminophenoxyacetylamino)decane, 1,2-di (3'-aminophenoxyacetylamino)ethane, 1,3-di(4'-aminophenoxyacetylamino)propane, 1,2-di(4'-aminophenoxyacetylamino)-1,2-dimethyl ethane, 1,2-di(alpha-4'-amino-phenoxypropionylamino)-ethane, 1,2-di(beta-4'-aminophenoxypropionylamino)ethane, 1,2-di(4'-amino-2'-methoxyphenoxyacetylamino)ethane, 1,2-di(2'-methyl-5'-aminophenoxyacetylamino)ethane, 1,2-di(2'-chloro-4'-aminophenoxyacetylamino)ethane, 1,3-di(alpha-4'-aminophenoxy-butyryl-amino)-pentane, 1,4-di(alpha-ethyl-beta-3'-amino-phenoxy-propionylamino)-4-methyl-3-ethyl-pentane, di-(4-aminophenoxyacetyl)-piperazine, 1,4-di(4-aminophenoxyacetylamino)-cyclohexane, 1,4-di-(4-aminophenoxyacetylamino)-cyclobutane, 1,4-di(4-aminophenoxyacetylamino)-dimethyl-cyclohexane, di(4-aminophenoxyacetyl)-methyl-piperazine, 1,2-di(3'-amino-phenoxyacetyl)-3,5-dimethyl pyrazolidine, 1,2-di(3'-amino-phenoxyacetyl)-2,5-dimethyl piperazine, 1,4-di(4'-aminophenoxyacetyl)-ethylene-trimethylene diamine.

The preferred embodiments of the invention are those in which the A component is resorcinol and the Y component is one of the amino-phenylpyrazolone or one of the amino-naphthol radicals of the kinds described. Of these the embodiments where Y is one of the amino-naphthol radicals are preferred.

Deeper shades than the direct or formaldehyde treated dyeings and with better light fastness are produced by after-treatment of these colors with water-soluble metal salts, such as water-soluble salts of copper, for example copper sulfate. For example, the after-coppering operation may be carried out by either of the procedures outlined in Example 1 for the after-treatment with formaldehyde, by using instead of formaldehyde a solution containing a 5% solution of hydrated cupric sulfate equal in amount to the formaldehyde used in the preceding step. In all cases the operation is allowed to continue for twenty minutes, or for such other time as is necessary to metallize the dyeing, at the end of which time the treated dyeings are removed, rinsed and dried. The after-coppering may replace the formaldehyde treatment, but both after-treatments are preferred where the best light fastness as well as washing fastness is desired. After-treatment with both formaldehyde and metal salts may be done either in the dye bath or in a fresh bath. When a fresh formaldehyde bath is used and the dyeing is treated for a sufficient time to form the formaldehyde compound, the metal salt may be added and the treatment continued for an interval of time. The dyeings are then removed, rinsed and dried. Similar results are obtained by reversing the order of adding the after-treating reagents, that is, by adding the metal salt solution first, treating for the necessary time, and then adding the formaldehyde solution. After treating the dyeing for about twenty minutes, it is removed, rinsed and dried.

The described method of dyeing is typical but it is to be understood that the invention is not restricted to the precise concentrations, temperatures and intervals of treatment specified in the examples since these details can be variously modified as will be understood by those skilled in the art. For example, the after-treatments with formaldehyde or metal salts may be carried on for longer or shorter periods and at higher or lower temperatures than those specified in the illustrations. Any treatment which will form a formaldehyde complex with the dyeing or one of the described metal complexes with the dyeing, as the case may be, produces the improved results with the dyes described. The exact composition of the described formaldehyde and metal complexes is unknown to me, but from my investigations it is my present belief that formaldehyde and metal complexes are formed.

Any of the halogens may be present as substituents where indicated. The sulfonic acid and carboxyl groups in the finished dyes may be the salts of any of the alkali metals and are produced by using bases of other alkali metals in the process instead of sodium. The acid forms of the finished dyes can be made by subjecting them to acids by methods well-known to the art.

The compounds of the invention in the form of their alkali metal salts give dyeings on cotton and similar dye susceptible fibers which are equal to or superior in washing fastness to the developed colors. The dyeings compare favorably in brightness with direct colors having other diamino diaryl nuclei but their washing fastness is of a superior order. The processes of applying the dyes of the invention are simple to operate since it is possible to make a complete dyeing in one bath. Thus the dyes of the invention combine the economy and simplicity of operation attainable with the use of direct dyes with the superior washing fastness which is attainable with developed dyes which require greater effort and expense on the part of the dyer.

Water-soluble metal salts of various metals can be used for metallizing the dyeings, those having atomic weights between 50 and 65 being the most suitable. As examples of such metals copper, chromium, nickel, cobalt and iron are mentioned. Either water-soluble salts of inorganic or organic acids can be used such as sulfates, halides, formates and acetates, for example copper sulfate, nickel sulfate, chromium chloride, copper formate, copper acetate and many other water-soluble metal salts of inorganic and organic acids.

Since from the foregoing description of the invention it will be apparent to those skilled in the art that the invention is susceptible of modification, it is to be understood that the invention is not limited to the specific illustrative embodiments.

I claim:

1. The tetrakisazo dyestuffs which in their acid form are represented by the formula

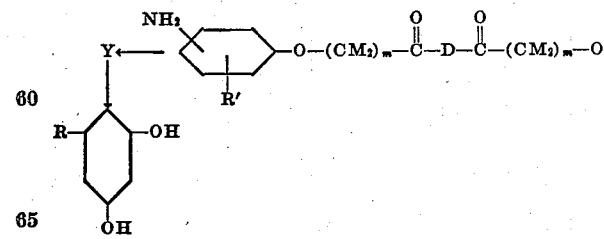

wherein R is one of a group consisting of hydrogen, straight and branched chain alkyl having 1 to 6 carbons, the corresponding alkoxy groups, hydroxy, amino, CN, halogen, sulfonic acid and carboxyl; R' is at least one of the group consisting of hydrogen, straight and branched chain alkyl having 1 to 6 carbons, the corresponding alkoxy groups, aryl-, aryl-alkyl-, halogen, CN, sulfonic acid and carboxyl; $CM_2$ is a group consisting of straight and branched chain aliphatic radicals wherein M occurs twice and is one of a group consisting of hydrogen and straight and branched chain alkyl having 1 to 6 carbon atoms; $m$ is an integer not greater than 10; D is the radical of a group consisting of straight and branched chain aliphatic diamines having a formula $NH_2-(CB_2)_n-NH_2$ wherein B occurs twice and is one of a group consisting of hydrogen and aliphatic radicals having 1 to 6 carbon atoms and $n$ is an integer 2 to 10, diamino cycloalkanes having 4 to 6 carbons in the ring and the 1- to 6-carbon saturated aliphatic derivatives thereof, and di-imino cyclic compounds having 3 to 6 carbons in the ring and the 1- to 6-carbon saturated aliphatic derivatives thereof; each Y is the radical after coupling and azotization of a compound of the group consisting of the 1-(amino phenyl)- pyrazolones and compounds of the benzene and naphthalene series which are represented by the formulae

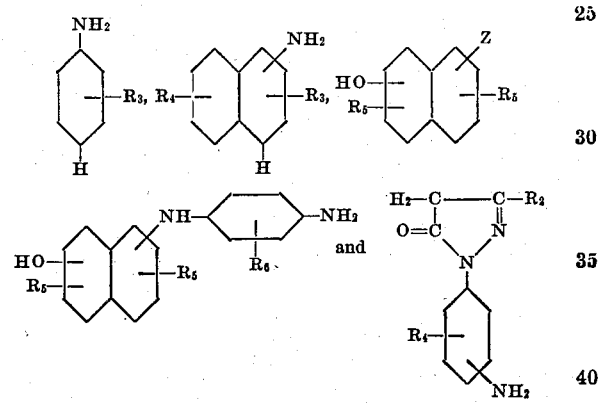

wherein $R_2$ is one of a group consisting of methyl and carboxyl; $R_3$ is at least one of a group consisting of hydrogen, alkyl and alkoxy having 1 to 6 carbons; $R_4$ is at least one of a group consisting of hydrogen, alkyl, alkoxy having 1 to 6 carbons, sulfonic acid and carboxyl; $R_5$ is one of a group consisting of hydrogen and sulfonic acid and —OH and —$SO_3H$ are separated in the naphthalene nucleus by at least one unsubstituted position; $R_6$ is one of a group consisting of sulfonic acid and carboxyl; and Z is one of a group consisting of amino and amino benzoylamino of the formula

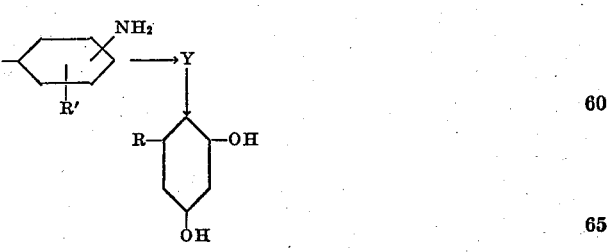

containing not more than two benzene nuclei and having one primary amino group meta or para to —CO—.

2. The tetrakisazo dyestuffs which in their acid form are represented by the formula

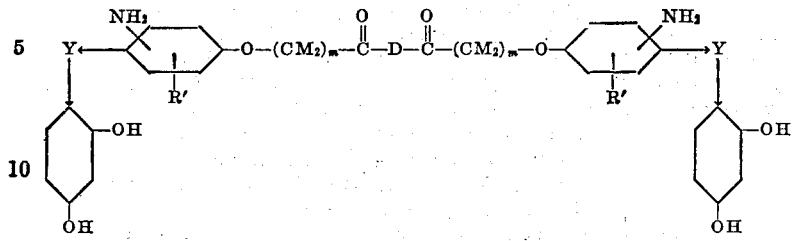

wherein R' is at least one of the group consisting of hydrogen, straight and branched chain alkyl having 1 to 6 carbons, the corresponding alkoxy groups, aryl-, aryl-alkyl-, halogen, CN, sulfonic acid and carboxyl; $CM_2$ is a group consisting of straight and branched chain aliphatic radicals wherein M occurs twice and is one of a group consisting of hydrogen and straight and branched chain alkyl having 1 to 6 carbon atoms; $m$ is an integer not greater than 10; D is the radical of a group consisting of straight and branched chain aliphatic diamines having a formula $$NH_2-(CB_2)_n-NH_2$$

wherein B occurs twice and is one of a group consisting of hydrogen and aliphatic radicals having 1 to 6 carbon atoms and $n$ is an integer 2 to 10, diamino cycloalkanes having 4 to 6 carbons in the ring and the 1- to 6-carbon saturated aliphatic derivatives thereof, and di-imino cyclic compounds having 3 to 6 carbons in the ring and the 1- to 6-carbon saturated aliphatic derivatives thereof; each Y is the radical after coupling and azotization of a compound of the group consisting of the 1-(amino phenyl)-pyrazolones and compounds of the benzene and naphthalene series which are represented by the formulae

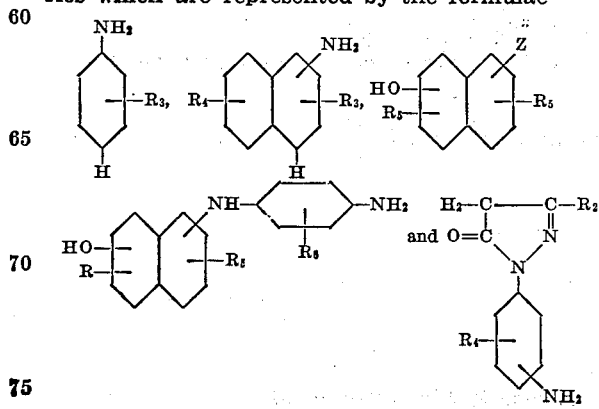

wherein $R_2$ is one of a group consisting of methyl and carboxyl; $R_3$ is at least one of a group consisting of hydrogen, alkyl and alkoxy having 1 to 6 carbons; $R_4$ is at least one of a group consisting of hydrogen, alkyl, alkoxy having 1 to 6 carbons, sulfonic acid and carboxyl; $R_5$ is one of a group consisting of hydrogen and sulfonic acid and —OH and —$SO_3H$ are separated in the naphthalene nucleus by at least one unsubstituted position; R is one of a group consisting of sulfonic acid and carboxyl; and Z is one of a group consisting of amino and amino benzoylamino of the formula

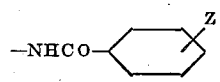

containing not more than two benzene nuclei and having one primary amino group meta or para to —CO—.

3. The azo compounds which in the form of their acids are represented by the formula

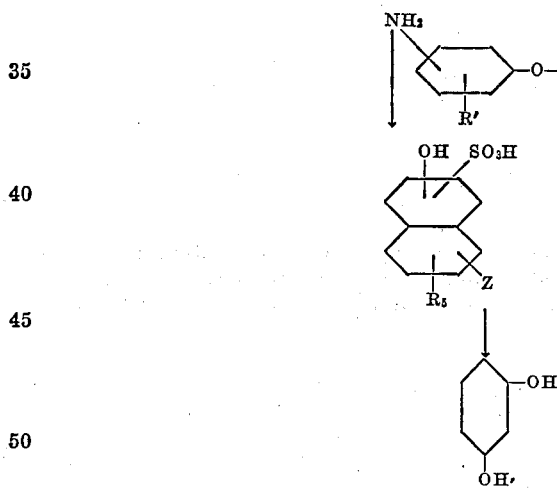
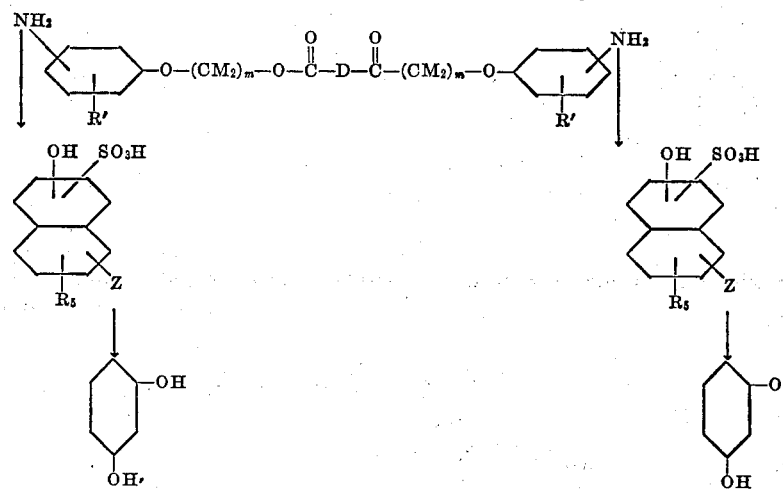

wherein R is one of a group consisting of hydrogen, straight and branched chain alkyl having 1 to 6 carbons, the corresponding alkoxy groups, hydroxy, amino, CN, halogen, sulfonic acid and carboxyl; R' is at least one of the group consisting of hydrogen, straight and branched chain alkyl having 1 to 6 carbons, the corresponding alkoxy groups, aryl-, aryl-alkyl-, halogen, CN, sulfonic acid and carboxyl; $CM_2$ is a group consisting of straight and branched chain aliphatic radicals wherein M occurs twice and is one of a group consisting of hydrogen and straight and branched chain alkyl having 1 to 6 carbon atoms; $m$ is an integer not greater than 10; D is the radical of a group consisting of straight and branched chain aliphatic diamines having a formula $NH_2-(CB_2)_n-NH_2$ wherein B occurs twice and is one of a group consisting of hydrogen and aliphatic radicals having 1 to 6 carbon atoms and $n$ is an integer 2 to 10, diamino cycloalkanes having 4 to 6 carbons in the ring and the 1- to 6-carbon saturated aliphatic derivatives thereof, and di-imino cyclic compounds having 3 to 6 carbons in the ring and the 1- to 6-carbon saturated aliphatic derivatives thereof; $R_5$ is one of a group consisting of hydrogen and sulfonic acid; —OH and —$SO_3H$ are separated in the naphthalene nucleus by at least one unsubstituted position and Z is one of a group consisting of amino and amino benzoylamino of the formula

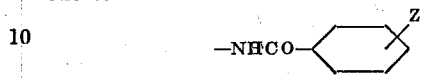

containing not more than two benzene nuclei and having one primary amino group meta or para to —CO—.

4. The azo compounds which in the form of their acids are represented by the formula groups, aryl-, aryl-alkyl-, halogen, CN, sulfonic acid and carboxyl; $CM_2$ is a group consisting of straight and branched chain aliphatic radicals wherein M occurs twice and is one of a group consisting of hydrogen and straight and branched chain alkyl having 1 to 6 carbon atoms; $m$ is an integer not greater than 10; D is the radical of a group consisting of straight and branched chain aliphatic diamines having a formula $NH_2$—$(CB_2)_n$—$NH_2$ wherein B occurs twice and is one of a group consisting of hydrogen and aliphatic radicals having 1 to 6 carbon atoms and $n$ is an integer 2 to 10, diamino cycloalkanes having 4 to 6 carbons in the ring and the 1- to 6-carbon saturated aliphatic derivatives thereof, and di-imino cyclic compounds having 3 to 6

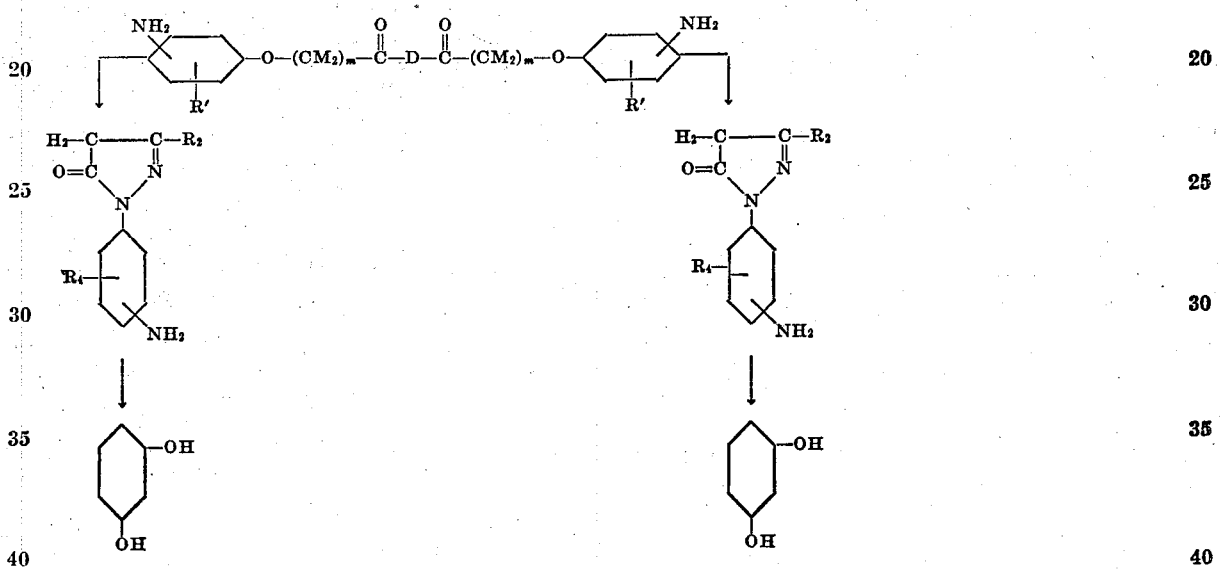

in which R' is one of a group consisting of hydrogen, straight and branched chain alkyl having 1 to 6 carbons, the corresponding alkoxy carbons in the ring and the 1- to 6-carbon saturated aliphatic derivatives thereof.

5. The compounds represented by the formula

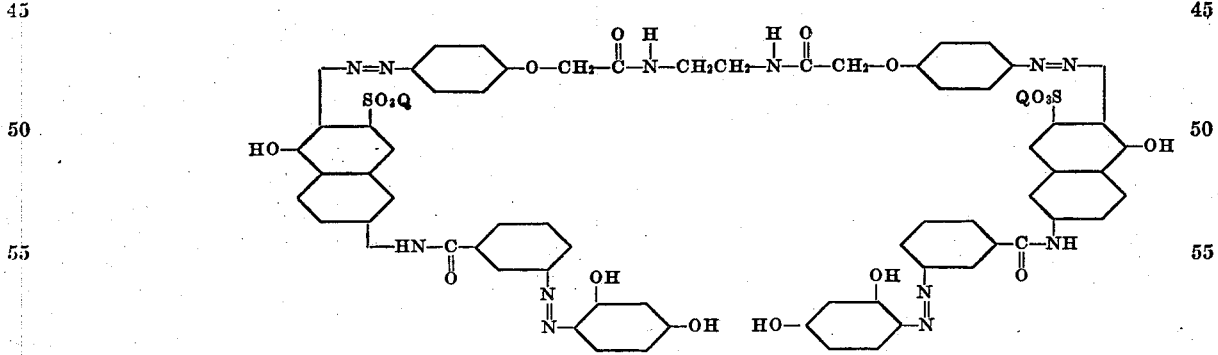

in which Q is an alkali metal.

6. The compounds represented by the formula

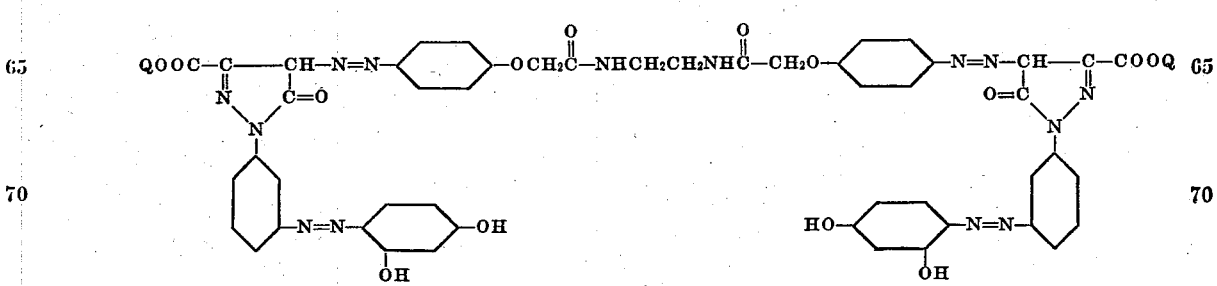

in which Q is an alkali metal.

7. The compounds represented by the formula

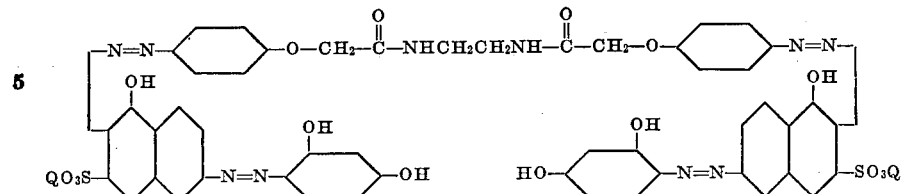

in which Q is an alkali metal.

8. The formaldehyde complexes of the compounds of claim 1.

9. The formaldehyde complexes of the compounds of claim 2.

10. The formaldehyde complexes of the compounds of claim 3.

11. The formaldehyde complexes of the compounds of claim 4.

12. The formaldehyde and metal complexes of the compounds of claim 1.

13. The process which comprises coupling a tetrazotized compound represented by the formula

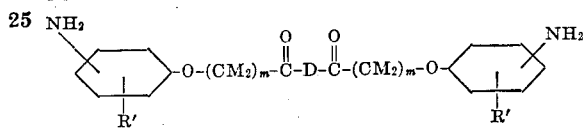

wherein R' is at least one of the group consisting of hydrogen, straight and branched chain alkyl having 1 to 6 carbons, the corresponding alkoxy groups, aryl-, aryl-alkyl-, halogen, CN, sulfonic acid and carboxyl; $CM_2$ is a group consisting of straight and branched chain aliphatic radicals wherein M occurs twice and is one of a group consisting of hydrogen and straight and branched chain alkyl having 1 to 6 carbon atoms; $m$ is an integer not greater than 10; D is the radical of a group consisting of straight and branched chain aliphatic diamines having a formula $NH_2-(CB_2)_n-NH_2$ wherein B occurs twice and is one of a group consisting of hydrogen and aliphatic radicals having 1 to 6 carbon atoms and $n$ is an integer 2 to 10, diamino cycloalkanes having 4 to 6 carbons in the ring and the 1- to 6-carbon saturated aliphatic derivatives thereof, and di-imino cyclic compounds having 3 to 6 carbons in the ring and the 1- to 6-carbon saturated aliphatic derivatives thereof; coupling said compound in alkaline medium with one of a group consisting of the 1-(amino phenyl)-pyrazolones and the compounds of the benzene series which are represented by the formulae

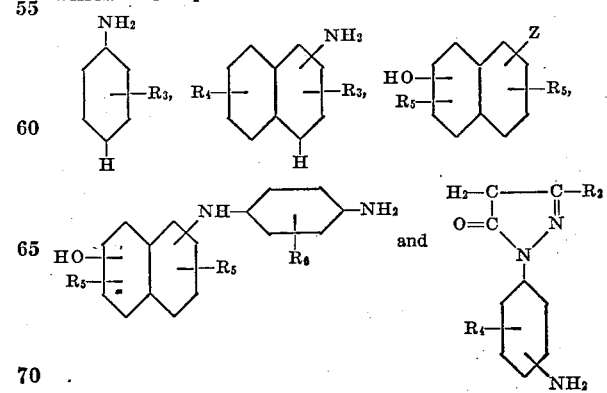

wherein $R_2$ is one of a group consisting of methyl and carboxyl; $R_3$ is at least one of a group consisting of hydrogen, alkyl and alkoxy having 1 to 6 carbons; $R_4$ is at least one of a group consisting of hydrogen, alkyl, alkoxy having 1 to 6 carbons, sulfonic acid and carboxyl; $R_5$ is one of a group consisting of hydrogen and sulfonic acid and —OH and —$SO_3H$ are separated in the naphthalene nucleus by at least one unsubstituted position; $R_6$ is one of a group consisting of sulfonic acid and carboxyl; and Z is one of a group consisting of amino and amino benzoylamino of the formula

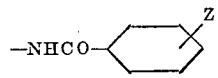

containing not more than two benzene nuclei and having one primary amino group meta or para to —CO—; tetrazotizing the disazo compound thus obtained and coupling in alkaline medium with a meta-dihydroxy-benzene which is represented by the formula

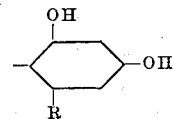

in which R is one of a group consisting of hydrogen, straight and branched chain alkyl having 1 to 6 carbons, the corresponding alkoxy groups, hydroxy, amino, CN, halogen, sulfonic acid and carboxyl.

14. The process which comprises dyeing a dyeable fabric with a compound in accordance with claim 1; and then applying aqueous formaldehyde until a formaldehyde complex is formed.

CHILES E. SPARKS.